United States Patent
Borst et al.

(10) Patent No.: US 7,353,873 B2
(45) Date of Patent: Apr. 8, 2008

(54) MAGNETIC ASSEMBLIES FOR DEPOSIT PREVENTION AND METHODS OF USE

(75) Inventors: Terence Borst, P.O. Box 795, Mina Al Fahal, PC116, Muscat (OM); Dudley J. Perio, Jr., 3613 Apache Forest Dr., Austin, TX (US) 78739; Daniel Scott Alms, Dickinson, TX (US)

(73) Assignees: Terence Borst (OM); Dudley J. Perio, Jr.

( * ) Notice: Subject to any disclaimer, the term of this patent is extended or adjusted under 35 U.S.C. 154(b) by 0 days.

(21) Appl. No.: 11/221,677

(22) Filed: Sep. 7, 2005

(65) Prior Publication Data
US 2006/0048941 A1    Mar. 9, 2006

Related U.S. Application Data

(60) Provisional application No. 60/607,739, filed on Sep. 7, 2004.

(51) Int. Cl.
*E21B 37/00* (2006.01)
(52) U.S. Cl. ............. 166/304; 166/66.5; 166/902; 210/695; 210/222
(58) Field of Classification Search ............. 166/66.5, 166/304, 250.05, 902; 210/695, 696, 222, 210/223
See application file for complete search history.

(56) References Cited

U.S. PATENT DOCUMENTS

| 3,228,878 | A |   | 1/1966  | Moody           |
|-----------|---|---|---------|-----------------|
| 3,637,033 | A |   | 1/1972  | Mayall          |
| 4,422,934 | A |   | 12/1983 | Debney et al.   |
| 4,564,448 | A |   | 1/1986  | O'Meara, Jr.    |
| 4,605,498 | A |   | 8/1986  | Kulish          |
| 4,935,133 | A | * | 6/1990  | Hirama ........ 210/222 |
| 5,024,271 | A | * | 6/1991  | Meihua ........ 166/66.5 |
| 5,052,491 | A |   | 10/1991 | Harms et al.    |
| 5,117,910 | A |   | 6/1992  | Brandell et al. |
| 5,178,757 | A |   | 1/1993  | Corney          |
| 5,366,623 | A |   | 11/1994 | Clair           |
| 5,453,188 | A |   | 9/1995  | Florescu et al. |

(Continued)

FOREIGN PATENT DOCUMENTS

WO    WO 81/02529 A    9/1981

OTHER PUBLICATIONS

Farshad, F.F., et al., "The Effects of Magnetic Treatment on Calcium Sulfate Scale Formation"; SPE 76767; May 20, 2002; pp. 1-9.

(Continued)

*Primary Examiner*—Jennifer H. Gay
*Assistant Examiner*—Robert Fuller
(74) *Attorney, Agent, or Firm*—Locke Lord Bissell & Liddell LLP (57) ABSTRACT

An apparatus and method for controlling and/or minimizing the formation or accumulation of unwanted deposits on the inside of fluid flow paths by employing at various locations along the path an assembly of permanent magnets oriented such that the fluid flow is preferably from the North magnetic pole to the South magnetic pole.

25 Claims, 6 Drawing Sheets

U.S. PATENT DOCUMENTS

| | | | |
|---|---|---|---|
| 5,700,376 A | 12/1997 | Carpenter | |
| 5,738,766 A | 4/1998 | Jefferson | |
| 5,998,681 A | 12/1999 | Rojey | |
| 6,003,597 A * | 12/1999 | Newman | 166/55.1 |
| 6,111,492 A * | 8/2000 | Fink | 335/302 |
| 6,558,541 B1 * | 5/2003 | Morrison | 210/222 |
| 6,641,725 B1 * | 11/2003 | Barnes | 210/222 |
| 6,733,668 B2 | 5/2004 | Pedersen et al. | |
| 2002/0056666 A1 | 5/2002 | Sharaf | |
| 2004/0055942 A1 | 3/2004 | Pedersen et al. | |
| 2005/0274524 A1* | 12/2005 | Silguero | 166/311 |

OTHER PUBLICATIONS

International Search Report for Corresponding International Application No. PCT/US2005/031857.

Written Opinion for Corresponding International Application No. PCT/US2005/031857.

Colic, M.; Chien, A.; Morse, D., Croatica Chemica Acta, vol. 71(4): pp. 905-916 (1998).

Crabtree, M.; Eslinger, D.; Fletcher, P.; Miller, M.; Johnson, A.; King, G.; "Fighting Scale—Removal and Prevention", Oilfield Review, pp. 30-45 (Autumn, 1999).

Marques, L.C.C.; Rocha, N.O.; Machado, A.L.C.; Neves, G.B.M.; Vieira, L.C.; Dittz, C.H., SPE Paper No. 38990.

* cited by examiner

MAGNETIC ASSEMBLIES FOR DEPOSIT PREVENTION AND METHODS OF USE

CROSS REFERENCE TO RELATED APPLICATIONS

The present application claims priority to U.S. Provisional Patent Application Ser. No. 60/607,739 filed Sep. 7, 2004, the complete teachings and disclosures of which are incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The invention relates to the inhibition of the formation of deposits inhibiting the flow of fluid in conduits and the like and, more specifically, to methods and devices for inhibiting the formation of unwanted deposits in downhole production equipment.

2. Description of Related Art

The problem of unwanted solid deposition in oil wells, gas wells, surface production equipment, and in hydrocarbon flow lines has presented a challenge to the petroleum industry since the first wells were drilled more than one hundred years ago. Although scale deposition is a major problem that interferes with the production of oil and gas, it is not the only problem. Paraffin or wax deposition has also been recognized as a major problem from the inception of the oil industry all over the world, as has asphaltene formation. The occurrence of these unwanted deposits in hydrocarbon producing conduits and related equipment can result in numerous problems, including reduced production and severe and often costly start up problems following pipeline shut down. Other problems with unwanted deposits can include congealing hydrocarbons, interface problems, depositions in tank bottoms, high line pressures, plugged flow lines, under deposit corrosion, plugging of injection wells and filter plugging.

Scale deposit and accumulation is a significant problem to oil and gas producer wells. The rate at which scale accumulates is dependent upon a variety of factors, including the quantity of minerals transported in the fluid, the temperature variations in the well bore, and pressure variations in the tubing, including variations resulting from tubing interior diameter changes. Once scale crystals begin to precipitate out of the fluid and form on the interior of the production conduit, the growth rate can accelerate. This phenomenon has been described as crystalline growth theory.

Chemical treatment methods for the removal of unwanted deposits such as scale, paraffin, asphaltene and hydrates, include acid treatments or the use of a variety of other chemicals to remove the unwanted deposits. Often, the type of chemical treatment method selected will vary depending upon the type of condensate or deposit. Chemicals, such as polyelectrolytes, phosphonates (such as DETPMP), polyphosphinocarboxylic acids (PPCA), organophosphonic acids (such as diethylenetriamine penta(methylphosphonic acid) and hexamethylenediamine tetramethylene phosphonic acid (HMDP)), and polymers such as polyacrylate (PAA), polyvinyl sulphonate (PVS), sulfonated polyacrylates, phosphomethylated polyamines (PMPA), and the ACUMER™ polymer products, such as ACUMER™ 2100, a carboxylate/sulfonate copolymer commercially available from Rohm and Haas Company (Philadelphia, Pa.) are often used to inhibit or prevent the growth of unwanted hydrocarbon deposits, such as scale crystals, on production tubing interiors. Other chemical-related treatments include the use of bacteria, enzymes, and continuous or batch down hole chemical injection and squeeze treatments of crystal modifiers. Typically, such chemicals are effective towards and limited to only specific types of deposits.

Despite their advantages, chemical treatments are usually expensive, environmentally hazardous in many cases, and are oftentimes very sensitive, working effectively only on specific crudes or on specific types of unwanted deposits. Chemical treatment often requires dedicated equipment to introduce the chemicals to the deepest sections of the well bore. Traditionally, scale prevention chemicals are injected down the annulus of the production tubing and enter the production tubing through sliding sleeves or other valves. In recent years, small stainless steel lines have been installed into the interior of the production tubing and run to the deepest point in the well bore. Scale prevention chemicals are pumped through the small line under pressure and mixed with the fluids produced from the well. This allows the fluid to be treated during normal production of the well, but requires continuous monitoring of the injection strings to maintain proper operation. In addition operation of the well is further complicated because access to the center of the production tubing is blocked, preventing through tubing, such as wire line or coiled tubing. Treatment chemicals are typically not recoverable from the production fluid.

Some deposits are so hard that chemicals are not effective, requiring physical methods for their removal, including mechanical removal. Physical methods have been studied and put to use for the past several decades as an alternative to chemical methods and to prevent and control unwanted deposit formation. Mechanical removal can include the use of drills, mills and other tools to grind or tear the deposits loose from the interior of the production tubing walls. Occasionally, such processes cause damage to the interior of the tubing and can cause worse scale accumulation rates in the future as a result. In worst-case scenarios, the production tubing must be extracted and replaced. Other physical methods which have been described include hot water circulation, steam injection, cutting or wire-lining, and the use of magnetic devices on electromagnets, such as solenoids and yoke-based electromagnets. However, while electromagnets can produce magnetic fields of great intensity, their choice for use in downhole environments is often not practical, as electromagnets need an electrical power supply, cooling, and require periodic servicing.

In contrast to electromagnetic devices, permanent magnet devices do not require an electrical down supply and require little to no maintenance. Several attempts have been made to use permanent magnet devices to reduce downhole buildup. Examples of several of the attempts include U.S. Pat. No. 3,228,878 which issued to Moody on Jan. 11, 1966 and discloses the use of magnets to provide a magnetic field having two polar zones a short distance from each other. The field may be provided by one or more high strength permanent magnets located outside the flow passageway and each having its poles facing toward the passageway in a direction normal to its path of flow. The magnetically treated liquid may flow with a minimum of turbulence and free it from external magnetic influence for a distance within the flow passageway from 10 to 150 times the length of the magnetic field to avoid too rapid a dissipation of the change effected therein by the passage through the magnetic field.

Another contribution to the art was made by Debney, et al. in U.S. Pat. No. 4,422,934, wherein a magnetic device for the treatment of calcerous fluids was disclosed. Described therein is a device for magnetically treating liquids to inhibit the deposit of scale in plumbing systems, appliances, boilers, and the like. The device has an elongate housing with an inlet and an outlet for the flow of liquid therethrough. A support structure is located inside the housing to retain a plurality of longitudinally spaced-apart magnets. The magnets are held in position by a plurality of transverse holding elements which are positioned so that the magnets are angularly disposed in a helical arrangement. The magnets are directly immersed in the liquid flowing through the device.

As a further example, U.S. Pat. No. 5,178,757 to Mag-Well, Inc. describes a device that includes an elongated hollow core providing at least one passage through which the fluid to be treated flows. An array of magnets extends longitudinally along the core with the poles of the magnets arranged so as to provide a magnetic field perpendicular to the flow path to enhance the magnetic conditioning effect of the tool. An alternative embodiment of the device has three longitudinally extending arrays of magnets with two fluid passages between them. The magnets are formed of a rare earth magnetic material, and are backed by a flux-carrying member of cobalt-iron alloy, with rounded corners so as to reduce loss of a magnetic field. Each magnet is mounted at least partially within an outer surface of the core with the flux-carrying member contacting, covering, and extending between the outer major faces of the magnets.

U.S. Pat. No. 5,052,491 issued to Harms, et al. on Oct. 1, 1991 describes the use of coupling devices that contain magnets to control the accumulation of paraffin and deposits in a downhole oil string or oil transmission flow lines. The coupling devices are made of a nonmagnetic material surrounded by a magnet and shield of magnetic material. The devices are used to join sections of oil string pipe together which form the downhole oil string casing. The magnetic coupling devices are placed at every 1,000 to 1,500 feet.

U.S. Pat. No. 5,453,188 issued to Florescu, et al. on Sep. 26, 1995 suggests an apparatus and method for preventing and minimizing the formation of deposits of paraffin, asphaltene and scale on the inside of downhole oil string line and on the surface of flow transmission lines. Successive magnet pairs are provided in magnetic discs along a section of pipeline. Each successive pair of magnets is rotated through a particular angle relative to the adjacent pair of magnets to achieve an advantageously prolonged trajectory of charged particles that populate the flowing fluid.

U.S. Pat. No. 5,700,376 issued to Carpenter on Dec. 23, 1997 describes an apparatus and method including first and second housing halves which are welded together to attach the apparatus to a pup joint installed in an oil casing. The housing includes a cylindrical portion and first and second frustoconical portions at opposite axial ends thereof. Axially extending L-shaped spacers are secured to the inside portion and include longitudinal edges which abut with the outer surface of the pipe. Series of axially spaced, first and right parallelepiped shaped magnets are sandwiched between the inside portion of the cylindrical portion and the outer surface of the pipe, with the poles of the first and magnets being reversed relative to the pipe. The housing halves are welded along their longitudinal free edges after being clamped together by a clamping band with sufficient force to secure the apparatus to the pipe generally by frictional forces and being free of the attachment to the pipe, and are secured along the casing pipe at approximately 1,000-foot intervals.

A Federal Technology Alert produced for the U.S. Dept. of Energy by Battelle Columbus Operations in January 1998 discloses the use of magnetic or electromagnetic scale control on a pipe through which water is flowing. It also discloses that manufacturers have applied the technology to petroleum pipelines to prevent wax build-up. A variety of other studies regarding the use and mechanisms of the use of magnets in treating scale, paraffin and asphaltene during petroleum production, including those by Farshad, F. F. et al. [SPE paper No. 77850, 2002; and, SPE paper No. 76767, 2002], and Tung, N. P., et al. [SPE paper No. 68749, 2001].

Applicants have created improved devices and methods for inhibiting deposit buildup in downhole hydrocarbon producing equipment.

SUMMARY OF THE INVENTION

Accordingly, it is an object of the present invention to provide a magnetic apparatus and system, as well as an associated method for preventing the accumulation of unwanted solid deposits in production tubing that fully integrates with a hydrocarbon carrying conduit, such as a downhole tubing string; can be easily assembled; can be easily installed on the pipeline as the pipeline is being assembled, or, can be easily incorporated into pre-existing downhole tubing; and, removes and prevents unwanted solid deposit formation or accumulation (e.g., scale formation) without the need for monitoring.

Each magnetic assembly in accordance with the present invention includes a one-piece cylindrical magnet, a magnet retention device, and a collar. The cylindrical magnet fits around the magnet retention device, which has a flange upon which the magnet sits. A collar engages a first end of the magnet retention device and retains the magnet on the magnet retention device. The collar further engages adjacent pipeline. The magnet retention device is provided with threads on a second end to engage adjacent pipeline. A plurality of magnetic subassemblies can be included along the pipeline at intervals up to about every 400 to about 500 feet. Other features and advantages of the invention will be apparent from the following description, the accompanying drawing and the appended claims.

BRIEF DESCRIPTION OF SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

While the inventions disclosed herein are susceptible to various modifications and alternative forms, only a few specific embodiments are shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art, and to enable such persons to make and use one or more of the inventive concepts.

DETAILED DESCRIPTION OF THE INVENTION

One or more illustrative embodiments incorporating the invention disclosed herein are presented below. Not all features of an actual implementation are described or shown in this application for the sake of clarity. It is understood that in the development of an actual embodiment incorporating the present invention, numerous implementation-specific decisions must be made to achieve the developer's goals, such as compliance with system-related, business-related, government-related and other constraints, which vary by implementation from time to time. While a developer's efforts might be complex and time consuming, such efforts would be, nevertheless, a routine undertaking for those of ordinary skill in the art having the benefit of this disclosure.

In general terms, Applicants have conceived of and developed devices and methods that utilize permanent magnets, such as but not limited to cylindrical rare earth magnets disposed adjacent the hydrocarbon flow line or other flow equipment to prevent and/or reduce unwanted deposit buildup. In general, the magnetic assembly is oriented such that hydrocarbon flow is from the North magnetic pole to the South magnetic pole. The devices and methods include original equipment for use downhole and retrofit equipment to modify existing downhole equipment.

In one embodiment of the present invention, an apparatus for magnetically treating fluids flowing through a conduit or other equipment to inhibit the formation and/or deposition of solid phase deposits within the conduit is described. The apparatus may comprise an elongated tubular member configured to be interconnected with the conduit in an axial manner, having at a first end an inlet means for receiving the flowing fluids and a second end longitudinally opposite the first end which provides an outlet means for the flowing fluid; a magnet, having a North pole, a South pole, an interior surface and an outer surface; a tubular magnet retention device having a first end and a second end, comprising a flange having a top surface disposed between the first and second end and encircling the elongated tubular member; and a collar threadably disposed at the second end, wherein the magnet rests upon the top surface of the flange. Typically, the magnet is oriented in a manner such that the North pole of the magnet is oriented toward the distal end of the apparatus.

In a further embodiment of the present invention, an apparatus for treating hydrocarbon and aqueous fluids within a downhole hydrocarbon production tubing to prevent the formation and/or deposition of solid phase deposits within the tubing is described, wherein the apparatus comprises an elongated tubular member configured to be interconnected with the conduit in an axial manner, having at a first end an inlet means for receiving the flowing fluids and a second end longitudinally opposite the first end which provides an outlet means for the flowing fluid, a cylindrical magnet, having a North pole, a South pole, an interior surface and an outer surface, a tubular magnet retention device having a first end and a second end, comprising a flange having a top surface disposed between the first and second end and encircling the elongated tubular member, and a collar threadably disposed at the second end. It is presently preferred that the magnet rests upon the top surface of the flange. Typically, in accordance with this aspect of the invention, the cylindrical magnet is oriented in a manner such that the North pole of the magnet is oriented toward the distal end of the apparatus, and is capable of longitudinal movement along the main body of the assembly, between the retention device and the collar.

In a further aspect of the above embodiments, the apparatus can further comprise a cylindrical lock nut longitudinally placed between the magnet and the second end, a first cylindrical seal, and a second cylindrical seal, wherein the first cylindrical seal forms an interface between the North magnetic pole of the magnet and the top surface of the flange, and the second cylindrical seal forms an interface between the South magnetic pole and an edge of the lock nut, such that the cylindrical lock nut prevents longitudinal movement of the magnet.

In a further embodiment of the present invention, a collar stop apparatus for magnetically treating fluids flowing through downhole hydrocarbon production tubing which extends into a subterranean formation, the collar stop apparatus comprising an elongated, substantially tubular main body having a proximal end and a distal end; a lock nut threadably attached to the proximal end of the main body; a retaining assembly having axially slidable retention arms with a plurality of locking pins, the retaining assembly disposed at the distal end of the main body; a cylindrical magnet retention device having a top edge and a bottom edge, the retention device being disposed between the lock nut and the retaining assembly and having a support flange with a top surface at one end; and a cylindrical magnet having a North pole, a South pole, an interior surface and an exterior surface, wherein the cylindrical magnet is disposed upon the support flange of the magnet retention device. Typically, in accordance with this aspect of the invention, the collar stop apparatus is an F-type collar stop and the cylindrical magnet is oriented in a manner such that the North pole of the magnet is oriented toward the distal end of the apparatus, and is capable of longitudinal movement along the main body of the assembly, between the retention device and the collar.

In another embodiment of the present invention, a process for removing, inhibiting, or preventing the formation of unwanted solid phase deposits from hydrocarbons present in a fluid flowing through production tubing is described, the process comprising threadably attaching a magnetic assembly apparatus as described herein to an end of a first conduit to be placed in a subterrean wellbore, running the conduit into the subterranean formation, attaching and placing a plurality of conduits to the first conduit, and threadably attaching a further magnetic assembly apparatus as described herein to an end of a subsequent conduit to be placed in a subterranean wellbore. This process can be repeated a number of times, so as to have a plurality of magnetic subassemblies running substantially the entire axial length of the conduit. Such a plurality of magnetic subassemblies are preferably spaced a longitudinal distance apart along the tubing string, typically from about 100 feet to about 500 feet apart.

While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups.

Figure 1:
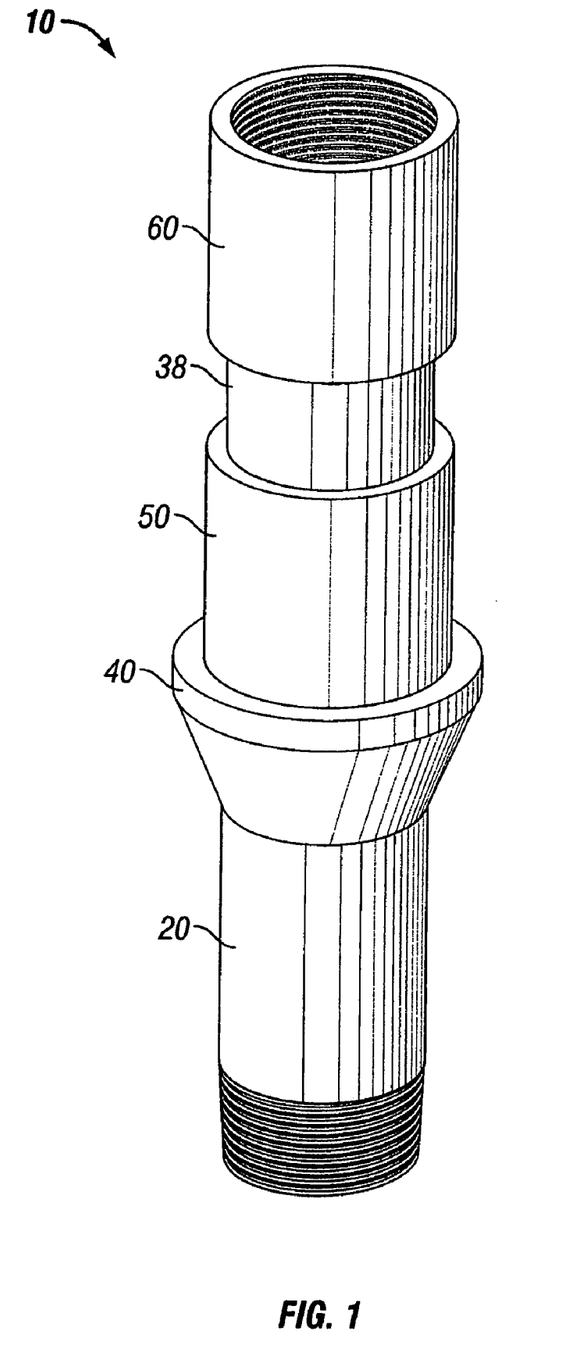
FIG. 1 illustrates a perspective view of a magnetic assembly in accordance with one aspect of the present invention.

Turning now to a more detailed description of an embodiment utilizing one or more of the present inventions, FIG. 1 illustrates a magnetic assembly 10 which includes a magnet retention device 20, a magnet 50 and a collar 60. Magnetic assembly 10 readily integrates into downhole production tubing or piping (not shown), thereby providing fluid communication between tubing strings (not shown) adjoined by magnetic assembly 10.

Figure 2:
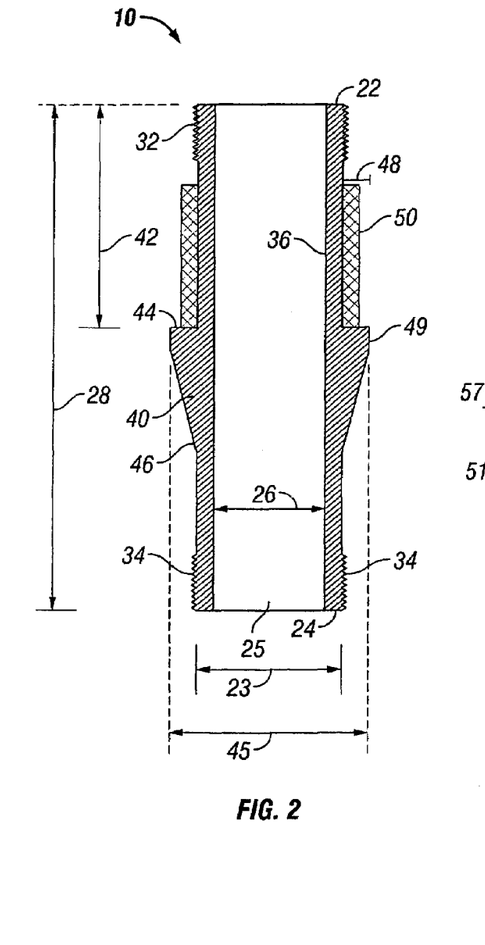
FIG. 2 illustrates a cross sectional view of a magnet retention device in accordance with the present invention.

Magnet retention device 20, illustrated in FIG. 2, has a generally tubular shape with an inner surface 36 defining an orifice 25 providing communication between a retention device first end 22 and a retention device second end 24. It is preferred, but not necessary, that orifice 25 maintains a constant orifice diameter 26 throughout the device length 28 of retention device 20.

First end threads 32 are provided proximate to retention device first end 22 and second end threads 34 are provided proximate to retention device second end 24. First end threads 32 engage collar 60 shown in FIG. 1. Second end threads 34 are used to threadably connect magnetic assembly 10 to an adjacent pipeline (not shown).

Magnet retention device 20 has a device wall 30 having an outer diameter 23. Device wall 30 has a wall thickness 31, which is measured between device inner surface 36 and device outer surface 38.

A flange 40 is provided along retention device 20 at a length 42 from first end 22. Magnet 50 typically rests upon a top surface 44 of flange 40, thus flange 40 maybe buttressed on a bottom surface 46 to provide additional support. Flange 40 has a flange width 48, which is the distance from device outer surface 38 to a flange edge 49. Flange 40 encircles device wall 30 and has a flange diameter 45.

Figure 3:
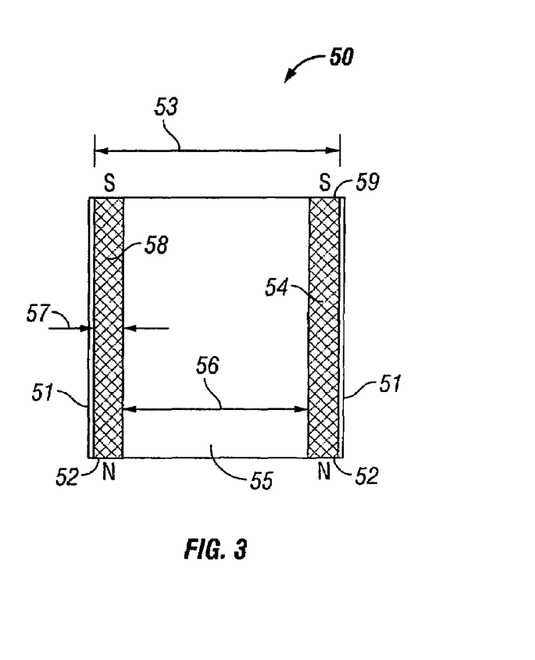
FIG. 3 illustrates a cross sectional view of a magnet in accordance with the present invention.

Referring now to FIG. 3, magnet 50 is substantially cylindrically shaped with an opening 55 there through. Magnet 50 has a magnet inner diameter (i.d.) 56 and a magnet outer diameter (o.d.) 53. Magnet i.d. 56 is larger than magnetic retention device 20 outer diameter 23, thereby permitting magnet 50 to slide over first end 22 when collar 60 is not present. Magnet i.d. 56 is smaller than flange diameter 45, thereby allowing magnet 50 to be prevented from sliding beyond flange 40 toward second end 24 of magnetic retention device 20. Magnet o.d. 53 can be less than or equal to flange diameter 45.

Figure 4:
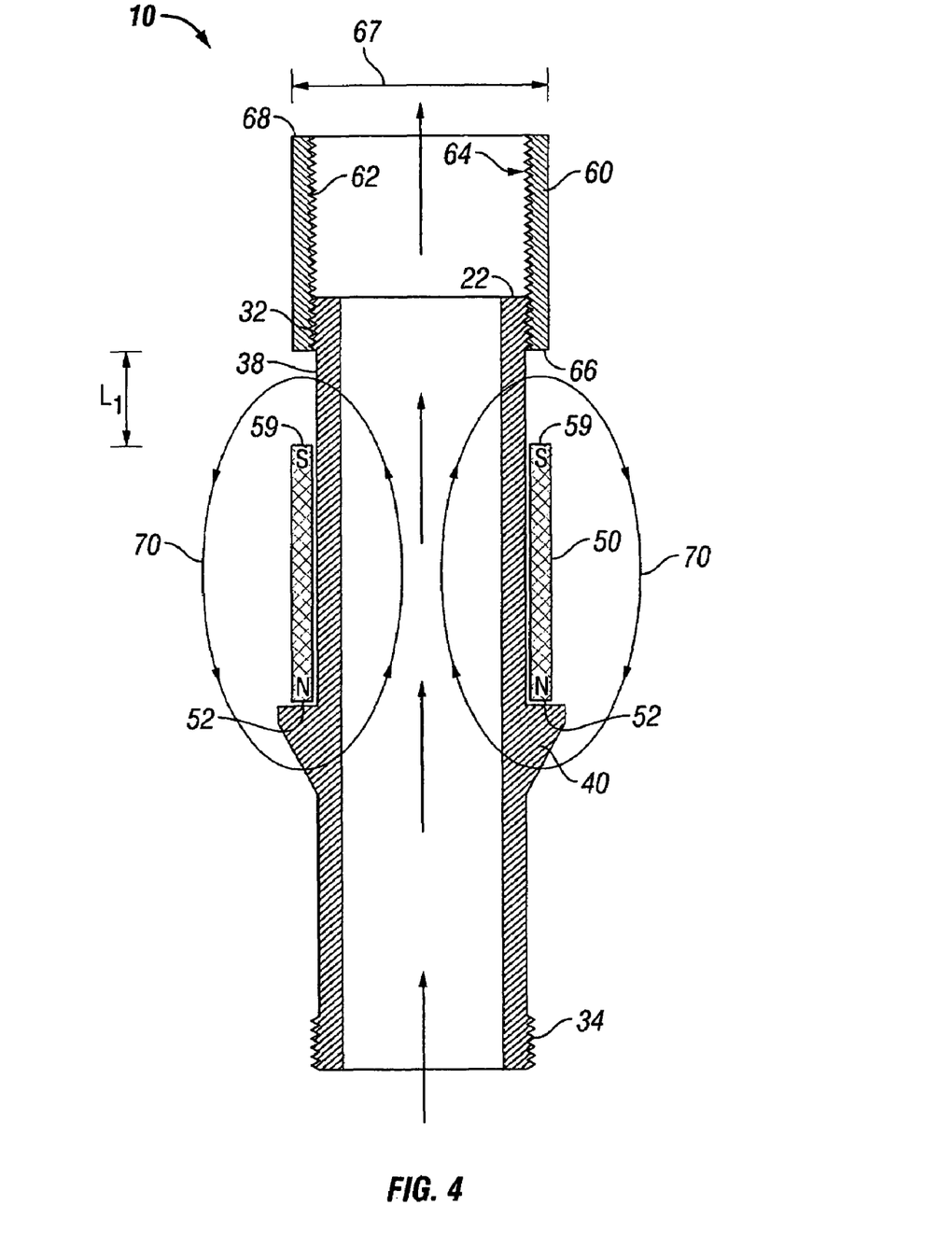
FIG. 4 illustrates a cross sectional view of the magnetic assembly of FIG. 1, taken along line A-A.

In one aspect of the present invention, magnet outer diameter 53 is less than flange outer diameter 45 so that magnet 50 is substantially protected and not lifted off from flange 40 while magnetic assembly 10 is lowered downhole. In one aspect of the present invention, when magnet 50 is placed onto magnet retention device 20, the North pole 52 of magnet 50 can be facing flange top surface 44. That is, the cylindrical magnet is installed in a North (negative) to South (positive) flow direction, relative to the flow of hydrocarbons through the conduit. However, magnet 50 can optionally also be placed onto magnet retention device 20 in such a manner that North pole 52 of magnet 50 is oriented opposite flange top surface 44, and the South pole 59 is facing flange top surface 44 (not shown)—that is, in a South (positive) to North (negative) flow direction. Thus, as illustrated in FIG. 4 with respect to magnet 50, fluid flows through orifice 25 in a north-to-south direction, as represented by the arrows. With respect to fluid flow parameters, the rate of fluid flow through orifice 25 can have a critical flow velocity such that the spacing of a plurality of magnetic assemblies 10 along a tubing string can be preferably maximized, e.g., from about 400 feet to about 500 feet apart. However, as the critical flow velocity changes, so too can the spacing of the magnetic assemblies. Examples of suitable critical fluid flow velocities, in accordance with the present invention, include fluid flow velocities ranging from about 1 ft/sec to greater than 100 ft/sec, including about 1 ft/sec, 2 ft/sec, 3 ft/sec, 4 ft/sec, 5 ft/sec, 6 ft/sec, 7 ft/sec, 8 ft/sec, 9 ft/sec, 10 ft/sec, 20 ft/sec, 30 ft/sec, 40 ft/sec, 50 ft/sec, 60 ft/sec, 70 ft/sec, 80 ft/sec, 90 ft/sec, 100 ft/sec, as well as velocities greater than 100 ft/sec and ranges between any two of these fluid flow velocities, e.g., from about 7 ft/sec to about 60 ft/sec. It will be apparent to those of skill in the art, however, that fluid flow velocity is not the only parameter upon which spacing of the magnetic subassemblies can rely, as other factors such as tubing diameter can have an effect on the spacing of a plurality of magnetic assemblies 10.

While not wishing to be limited by any one theory of operation, it is presently believed that the resulting magnetic field 70 induces polarization of fluid molecules (not shown) passing through field 70 in such a manner that molecules are repelled by the magnetic field and by other polarized molecules. As a result, molecules are less likely to attach to each other and to crystallize and adhere to the inner surface 36 of assembly 10 or to the inner surface of the downhole piping or tubing (not shown), thereby preventing scale buildup. This likely occurs as a result of the influence of the positive, magnetic flux of the South pole, which changes the adhesion characteristics of liquids, making them more soluble. This is believed to occur when the ions are arranged in the fluid as they pass through a magnetic field of North to South orientation. As such, the positive effect of the South pole will repel the positively charged particles contained in the fluid, and will thus cause the particles to change from a random arrangement to a structured arrangement. By arranging the magnetic field such that particles pass through the positive, or South pole last, the positive side of the particles thus become the farthest spaced from the negatively charging conduit, or tubing. This realignment of the ions then carry, or retain the positive charge from the South polarization, known as the magnetic memory effect, and may be retained for periods of time up to one year.

Returning to FIG. 3, magnet 50 has a magnet inner surface 54, which faces device outer surface 38 when magnet 50 is assembled onto magnet retention device 20. Magnet 50 has a magnet wall 58, which has a magnet wall thickness 57. Magnet 50 is currently preferred to be a rare earth magnet, either sintered or bonded, of the samarium cobalt (SmCo) type, such as the sintered SmCo magnets available from Swift Levick Magnets (Derbyshire, U.K.). As used herein, the term "rare earth magnets" is meant to include magnets composed of alloys of the Lanthanide group of elements, as well as rare-earth transition metal magnets. Samarium cobalt magnets suitable for use herein include sintered SmCo magnets, as well as samarium cobalt alloy magnets, including both $SmCO_5$ and $Sm_2CO_{17}$ type magnets. A samarium cobalt magnet 50 is typically preferred for use in accordance with the present invention because of its corrosion resistance/resistance to oxidation, magnetic strength, structural strength, and thermal stability. Other rare-earth type magnets are also suitable for use herein, depending upon the particular environment in which it will be used. Such magents include hard ferrite (strontium hexaferrite, $SrO-6(Fe_2O_3)$) magnets, berrylium-copper magnets, neodymium-iron-boron (NdFeB) magnets, For example, in applications wherein the ambient temperature is less than 150° F. (65.6° C.), a rare earth magnet of the neodymium-iron-boron (NdFeB) type may be suitable for use.

In one aspect, a protective shield 51 may be applied to magnet 50. Protective shield 51 is provided to prevent fracture of or reduce stress on magnet 50 in a downhole environment. Shield 51 can be of various materials having sufficient strength to provide added protection to magnet 50. In accordance with the present invention, the protective shield 51 can be nickel, zinc, aluminum, or any other appropriate, metal or composite material. Preferably, protective shield 51 is a non-magnetic nickel or a nickel-containing alloy.

Referring to FIGS. 1 and 4, after magnet 50 is resting on flange 40 of magnet retention device 20, collar 60 may be attached to prevent magnet 50 from sliding over first end 22. Collar 60 includes collar threads 62 or other coupling mechanisms along collar inner surface 64. Collar threads 62 accept first end threads 32 so that collar 60 is threadably engaged at a collar first end 66 with first end 22 of magnet retention device 20. Collar 60 has a collar outer diameter 67, which is typically greater than magnet inner diameter 56 (shown in FIG. 3), thereby ensuring that magnet 50 is retained between flange 40 and collar 60.

In one aspect of the present invention, as shown in FIG. 4 for example, collar first end 66 can be separated from magnet 50 by a spacing $L_1$, allowing magnet 50 to move longitudinally along device outer surface 38. Collar threads 62 also permit removal of collar 60, allowing for replacement of magnet 50 as necessary. Collar threads 62 extend along the inner surface 64 of collar 60 from collar first end 66 to a collar second end 68. Collar threads 62 proximate collar second end 68 are used to connect magnetic assembly 10 to adjacent pipeline (not shown).

Figure 5:
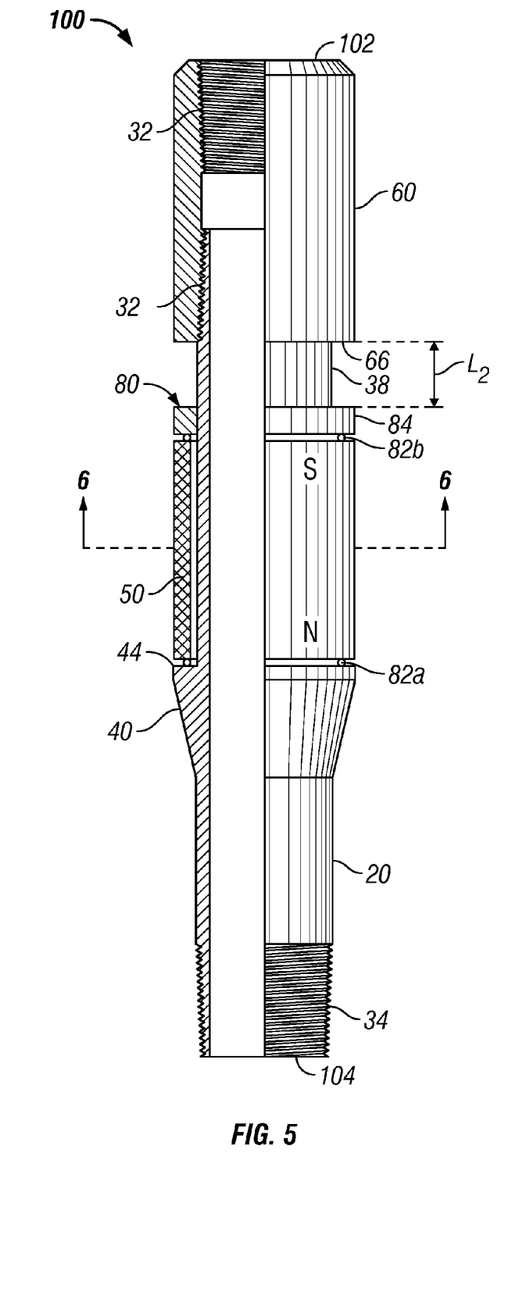
FIG. 5 illustrates a half-section view of a assembly in accordance with an aspect of the present invention.

FIG. 5 illustrates a further aspect of the present invention, wherein a magnetic assembly 100 comprises a magnetic retention device 20, flange 40, magnet 50, collar 60 and lock nut 80. Assembly 100 has a proximal end 102 and a distal end 104, spaced longitudinally apart. Both the proximal end and the distal end terminate in end threads 32 and 34, respectively. Proximal end 102, as illustrated, can have both first end threads 32 and secondary first end threads 32', both of which threadably engage collar 60 at the proximal end of assembly 100. Distal end threads 34 are used to threadably connect magnetic assembly 100 to an adjacent conduit or pipe.

Magnetic assembly 100 is also provided with a flange 40 along retention device 20, which is longitudinally displaced from distal end 104. Magnet 50 rests atop flange 40, but is constrained from longitudinal movement along outer surface 38. While shown in the preferred orientation of the North (N) magnetic pole of magnet 50 oriented towards the distal end of assembly 100 and the South (S) magnetic pole of magnet 50 oriented towards the proximal end of assembly 100, it is realized that the orientation can be reversed, and that a plurality of such cylindrical magnets 50 could be used, provided they do not extend outwardly away from outer surface 38 past the outer edge of flange 40. As is further shown in FIG. 5, magnetic assembly 100 also comprises at least two seals 82a and 82b, and lock nut 80. Seals 82a forms an interface between the North magnetic pole (N) of magnet 50 and top surface 44 of flange 40, while seal 82b similarly forms an interface between South magnetic pole (S) of magnet 50 and the bottom edge of lock nut 80. Lock nut 80 is generally cylindrical in shape, with an opening therethrough (not shown), having a top face and a bottom face, and outer edge 84. Lock nut 80 is slidably added over the proximal end of assembly 100 prior to the threadable attachment of collar 60. Once slidably added over outside edge 38 of the assembly, lock nut 80 is compressed against seal 82b, and is held in place by a plurality of threaded attachment means that attach lock nut 80 via outer edge 84 to the outside edge 38 of the magnetic assembly. Such threadable attachment means include set screws (e.g., slotted or socket set screws), countersunk screws, cup point socket set screws, knurled point socket set screws, oval point set screws, cone point set screws, and half-dog point set screws. Lock collar 80 thus retains magnet 50 in position against flange 40, and maintains a static, longitudinal distance $L_2$ between the top face of lock collar 80 and collar first end 66.

Seals 82a and 82b, as indicated previously, can be any number of sealing materials, including but not limited to elastomers, and can be in any suitable multiplicity (e.g., four seals). Typically, seals 82a and 82b are O-rings are other similar, taurus-shaped objects, which can be made from a number of elastomeric materials so as to seal against fluid movement. In the instance that seals 82a and 82b are O-rings, they are typically inserted into cavities, known as glands, which can be either axial or radial, as known in the art. The O-ring seals 82a and 82b shown in FIG. 5 are illustrated in a radial seal geometry. Seals 82a and 82b can be made of any number of materials which can provide both chemical and temperature resistance. Such material typically has a temperature resistance in the range from about –26° F. (–32° C.) to about 600° F. (316° C.), and more typically from about –15° F. (–26° C.) to about 400° F. (205° C.). Suitable materials for use as seals 82a and 82b include but are not limited to fluorocarbon rubber (FKM)-type seals and O-rings, including KEL-F® and FLUOREL® (both available from 3M, St. Paul, Minn.), VITON® and KALREZ® (both available from E.I. DuPont de Nemours Co.); chlorosulfonated polyethylenes, such as HYPHALON® (available from DuPont Dow Elastomers); PTFE (TEFLON®) and filled PTFE such as FLUOROSINT® (available from Quadrant DSM Engineering Plastic Products, Reading, Pa.); copolymers of butadiene and acrylonitrile, known as Buna-N (nitrile; NBR), such as HYVCAR® (available from Goodrich Chemical Co.); and silicone or silicone rubber. Typically, seals 82a and 82b are fluorocarbon rubber-type seals, such as VITON®.

Figure 6:
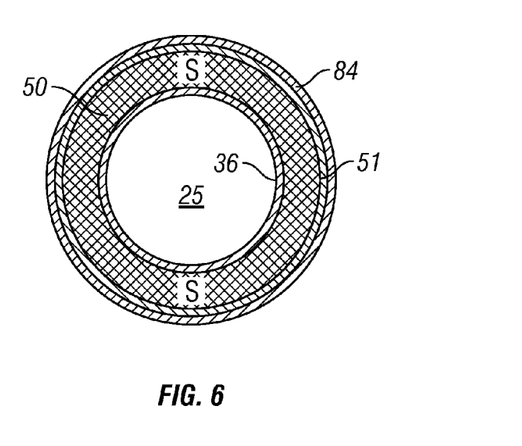
FIG. 6 illustrates an enlarged cross-sectional view of the assembly of FIG. 5, taken along line B-B.

A cross-section of the sub-assembly of FIG. 5, taken along line 6-6, is shown in FIG. 6, showing several of the components of magnetic assembly 10 which include many of the same components except for the collar assembly and the lock nut 80 in FIG. 5, but does include a section of the non-magnetic fluid conduit in contact with magnet 50 of the hydrocarbon flow line. The flow line tool includes inner surface 36, which forms a boundary between Rare Earth magnet 50 and central orifice 25, the inner surface of assembly 10 being of a non-magnetic alloy material. The assembly can further be seen to comprise cylindrical magnet 50 surrounding assembly 10, the magnet having a protective shield 51. Also visible in FIG. 6 is outer edge 84 of lock nut 80, illustrating that magnet 50 works in providing a smooth exterior not extending outside of the normal dimensions of the tubular.

Figure 7A:
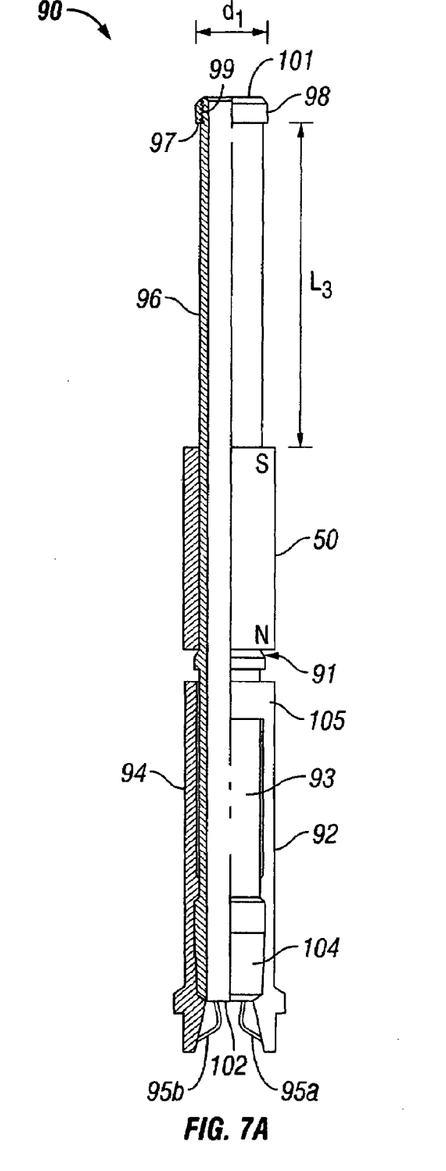
FIG. 7A illustrates a half-section view of a Type-F collar stop assembly in closed form, in accordance with an aspect of the present invention.
Figure 7B:
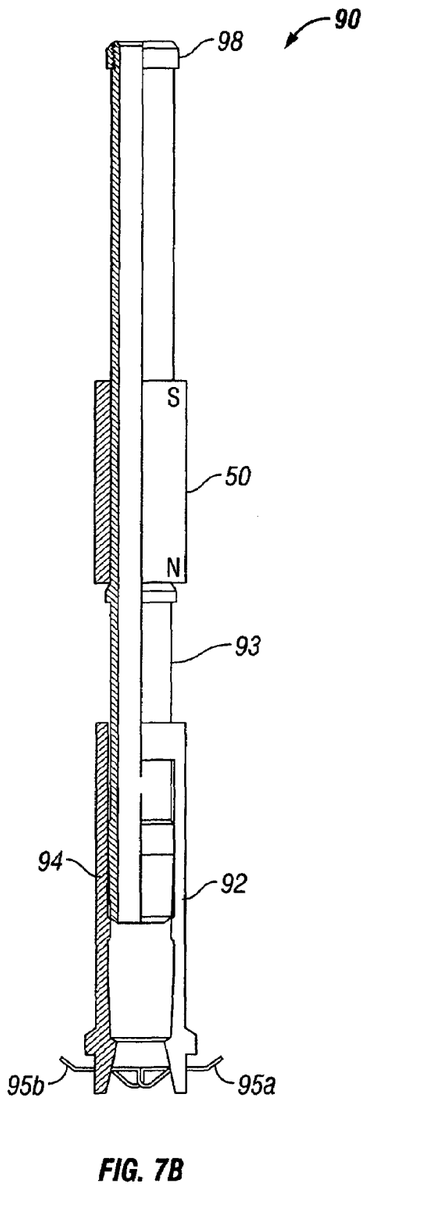
FIG. 7B illustrates a half-section view of the collar stop of FIG. 7A in open form.

FIGS. 7A and 7B illustrate another aspect of the present invention. As shown therein, magnetic assembly 90 is a Type "F" collar stop (such as those available from FMS Inc., New Iberia, La.) comprising a main body 96, retention arms 92 and 94, locking pins 95a and 95b, support flange 91, magnet 50, and lock nut 98. As illustrated therein, magnet 50 rests upon flange 91. While not illustrated in FIG. 7A, magnet 50 can also have seals above and below it, as shown in FIG. 5. After magnet 50 is resting on flange 91 of magnetic retention device 90, lock nut 98 can be attached to prevent magnet 50 from sliding over proximal end 101. Lock nut 98 includes collar threads 99 along the inner surface, which accept end threads 97 on the proximal end of assembly 90 so that lock nut 98 is threadably engaged at the proximal end of magnetic assembly 90. Lock nut 98 has a collar outer diameter, $d_1$, which is typically greater than the outer diameter of magnet 50, thereby ensuring that magnet 50 is restrained between lock nut 98 and flange 91. In one aspect of the present invention, lock nut 98 is longitudinally separated from magnet 50 by a length $L_3$, allowing magnet 50 to move along main body 96 of apparatus 90. Threadably attached lock nut 98 also allows for the removal of the lock nut so as to allow for replacement of magnet 50 as necessary.

Magnetic collar stop assembly 90 also comprises slidable, lockable retaining arms 92 and 94, as illustrated in FIGS. 7A and 7B. Retaining arms 92 and 94 form a part of retaining assembly 105, located at the distal end 102 of assembly 90. Retaining assembly 105 is slidably disposed along lower body 93 of assembly 90, having a lower end stop formed by flanged end 104 at distal end 102, and an upper end stop formed by flange 91 which retains magnet 50. At the distal end of retaining arms 92 and 94 are locking pins 95a and 95b, which when tripped by a running tool release retaining arms 92 and 94 and allow apparatus 90 to lock into position, for instance in a collar gap.

FIG. 7B illustrates magnetic assembly collar stop 90 in a position just prior to engagement. Following being run into the interior conduit of a tubing string, a wire tool operably engages and trips pins 95a and 95b. Magnetic collar assembly 90 is then pulled back up the interior of the tubing string, wherein retaining arms 92 and 94 latch the collar stop assembly into one of the selected collars of the tubing string.

Figure 8:
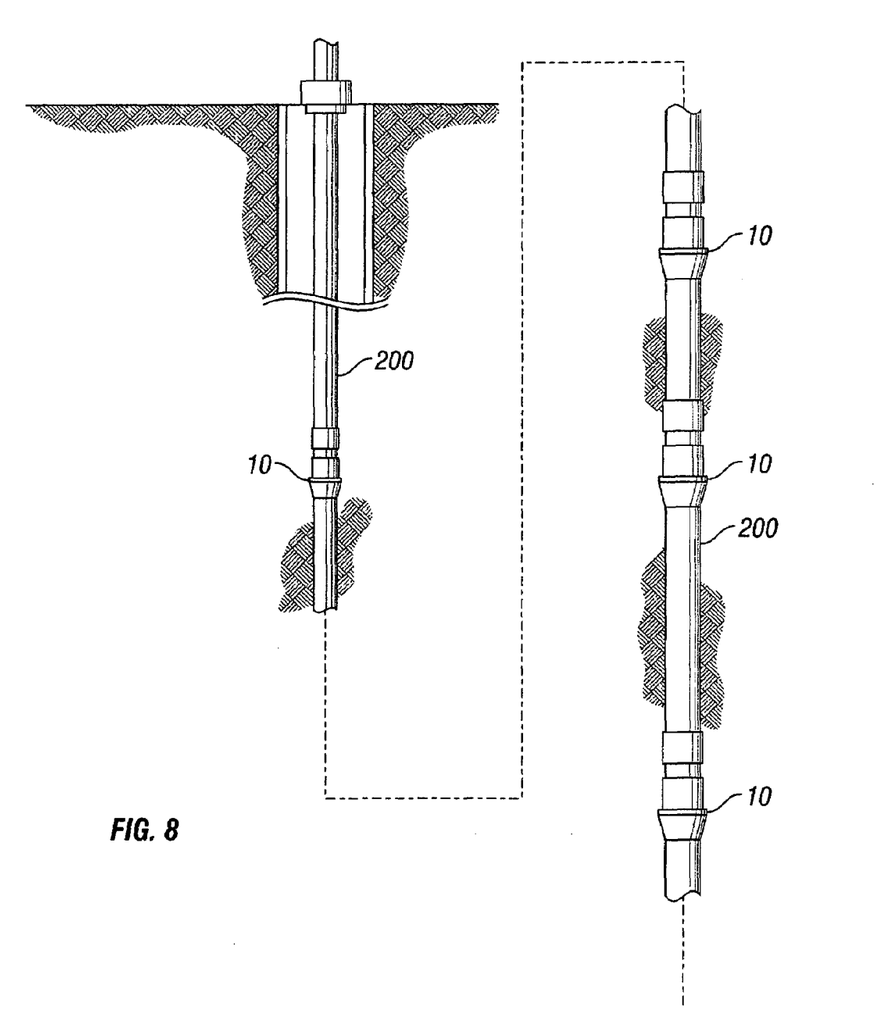
FIG. 8 illustrates an elevational view partly in section of a downhole production string including a plurality of sub-assemblies in accordance with an aspect of the present invention.

As illustrated in FIG. 8, a plurality or series of magnetic subassemblies 10 can be integrated into a pipe or tubing structure that is being placed down hole. In one aspect, the magnetic assemblies 10 are connected into the pipe or tubing 200 at intervals of approximately 400 to 500 feet. Other spacing arrangements may be provided within the scope of the invention, such that the spacing arrangements of magnetic assemblies 10 are in the range of from about 50 feet to about 500 feet, as well as ranges in between. Typical spacing ranges between magnetic assemblies 10 include, for example, about 50 feet, about 100 feet, about 150 feet, about 200 feet, about 250 feet, about 300 feet, about 350 feet, about 400 feet, about 450 feet and about 500 feet, as well as ranges between any two of these values, i.e. from about 150 feet to about 400 feet. As discussed previously, magnetic field 70 produced by the magnet 50 within each magnetic assembly 10 prevents unwanted solid phase buildup on the inside of the pipeline.

In accordance with the apparatus and systems of the present invention, as well as the associated methods employing such apparatus and systems, at least one undesirable solid phase deposit can be controlled, minimized, or prevented using the magnetic systems described herein. As used herein, the term "solid phase deposit" refers broadly to those compounds or compositions which can form and deposit within a production casing, thereby decreasing the well production profile. These solid phase deposits include, but are not limited to, scale deposits, paraffin deposits, asphaltene deposits, hydrates, and combinations thereof.

Scale formation, as used herein, can generally be thought of as an adherent deposit of predominantly inorganic compounds. In this regard, a common process leading to scale formation in hydrocarbon production operations is the precipitation of sparingly soluble salts from oilfield brines. Some oilfield brines contain sufficient sulfate ion in the presence of barium, calcium, and/or strontium ions that the potential for forming barium sulfate ($BaSO_4$) and/or strontium sulfate ($SrSO_4$) scale exists. Often, the formation of scale results in reduced production and increased maintenance costs associated with the hydrocarbon production. Further, in some locations, naturally occurring radioactive materials have been found to incorporate themselves into the scale, resulting in health, safety, and liability concerns and increased scale disposal costs, in addition to the removal and/or inhibition of scale formation. Accordingly, scale deposits, as used herein, refer to those classes of compounds including but not limited to calcium carbonate ($CaCO_3$), calcium sulfate ($CaSO_4$), calcium sulfide (CaS), barium sulfate ($BaSO_4$), barium sulfide (BaS), barium thiosulfate ($BaS_2O_3$), strontium sulfate ($SrSO_4$), sodium carbonate ($Na_2CO_3$), sodium sulfate ($Na_2SO_4$), sodium sulfide ($Na_2S$), potassium carbonate ($K_2CO_3$), potassium sulfate ($K_2SO_4$), magnesium sulfate ($MgSO_4$), magnesium chloride ($MgCl_2$), halite (NaCl), zinc sulfide (ZnS), zinc sulfite ($ZnSO_3$), zinc sulfate ($ZnSO_4$), lead sulfide (PbS), lead sulfite ($PbSO_3$), lead sulfate ($PbSO_4$), and the like, as well as combinations thereof.

Asphaltene are commonly defined as that portion of crude oil which is insoluble in heptane, are soluble in toluene, and typically exist in the form of colloidal dispersions stabilized by other components in the crude oil. Asphaltene are often brown to black amorphous solids with complex structures, involving carbon, hydrogen, nitrogen, and sulfur. Asphaltene are typically the most polar fraction of crude oil, and will often precipitate out upon pressure, temperature, and compositional changes in the oil resulting from blending or other mechanical or physicochemical processing. Asphaltene precipitation can occur in pipelines, separators, and other equipment, as well as downhole and in the subterranean hydrocarbon-bearing formation itself. Once deposited, these asphaltene generally present numerous problems for hydrocarbon producers, such as plugging downhole tubulars and/or wellbores, choking off pipes, and interfering with the functioning of separator equipment, all of which compound the production costs and require the need for remediation. Asphaltene, as used herein, includes the non-volatile and polar fractions of petroleum that are substantially insoluble in n-alkanes (such as pentane or hexane), as defined and described by Diallo, et al. ["Thermodynamic Properties of Asphaltene: A Predictive Approach Based on Computer Assisted Structure Elucidation and Atomistic Simulations", in *Asphaltene and Asphalts.2. Developments in Petroleum Science,* 40 B.; Yen, T. F. and Chilingarian, G. V., eds.: Elsevier Science B. V.: pp. 103-127 (2000)].

Natural gas hydrates, or simply hydrates, as described herein, comprise "cages" of water molecules enclosing "guest" molecules of natural gas, which occurs with sufficient combinations of temperature and pressure. Typical hydrate guest molecules include methane, ethane, propane, light hydrocarbons, methane-to-heptanes, nitrogen, hydrogen sulfide ($H_2S$), and carbon dioxide ($CO_2$). Natural gas hydrates can form during the production, gathering, and transportation of hydrocarbons in the presence of water at high pressures and low temperatures. Depending on the pressure and gas composition, gas hydrates can build up at any place where water coexists with natural gas at temperatures as high as 80° F. (about 30° C.). Once formed, hydrates can deposit in the tubing, flowlines, and/or process equipment, thus restricting flow. In many cases, these restrictions eventually form plugs. Gas transmission lines and new gas wells are especially vulnerable to being at least partially blocked by hydrates. Hydrate plugs represent safety hazards as they contain significant volumes of compressed natural gas and have been known to break free as projectiles in pipelines, causing several pipeline ruptures. As such, many in the industry feel it prudent to prevent hydrate plugs whenever possible, rather than trying to remediate them once they form.

The phenomenon of paraffin or wax deposit formation is common in petroleum industry and it occurs consequent to modifications in the thermodynamics variables that change the solubility of wax or paraffin fractions present in petroleum. The paraffining phenomenon involves specially saturated hydrocarbons of linear chain and high molecular weight during production, flow and treatment of petroleum. The deposition in subsea lines, surface equipment, production column, or even in reservoir rock can cause significant and crescent loss of petroleum production. Typically, paraffin deposits on the wall of downhole tubulars and other, similar places downhole such as near entrances and exits of chokes, and along collars and similar restriction devices in the flowpath of the produced petroleum.

Precipitation and deposition of wax are associated to phase equilibrium of hydrocarbons and to fluid-dynamics conditions of flow, respectively. The paraffining becomes one function of petroleum intrinsic characteristics and temperature, velocity and pressure variations during the production. The appearance of a solid phase in petroleum and the subsequent wax deposition are related to changes in the phase equilibrium, caused by petroleum cooling and/or separation of lighter fractions, originally dissolved in petroleum. As used herein, paraffin or wax refers to non-aromatic saturated hydrocarbons, or a mixture thereof, having the general chemical formula $C_nH_{2n+2}$, wherein n is an integer between and including 22 and 27.

The general methods of use of several of the assemblies and systems described herein are now described. Prior to selecting a magnetic system, typically one must first determine the fluid flow rate through the hydrocarbon conduit, and using this information further determine what system is needed, and the relative placement of such systems within the conduit. Information needed to calculate hydrocarbon flow rate through a conduit (tubing) includes one or more of the following: oil or gas condensate; reservoir pressure (psi); bottom hole temperature; water-to-liquid ratio; Formation Gas Specific (typically about 1.01); tubing inside diameter and outside diameter, and/or the tubing type and tubing weight; depth of the production tubing; casing inner diameter (i.d.) and depth; type of threaded connections used in the tubing string; and, tested gross liquid rate. Following the determination of which system to use, either an original assembly installation system (e.g., FIG. 5) is chosen, or a retrofit system (e.g., FIG. 7A) is chosen.

In the instance that tubing has not yet been run downhole, an original magnetic assembly system such as assembly 10 in FIG. 5 is chosen and put together (that is, the desired magnet, seals, and lock nut are installed on the assembly), and this is threadably attached to the end of the first tubing to be placed in the well. The first tubing of the tubing string is then run downhole, and consecutive tubings are attached and run downhole, with a plurality of magnetic assemblies 10 being positioned between about 400 ft and 500 ft apart, until the entire length of production tubing has been placed. At the surface, the tubing below the magnetic assembly is laid on the drill floor, and the assembly is hand-threaded into the box connection. The next tubular pin end is threadably attached into the box connection of the assembly, and the "make-and-break" device is connected onto the tubular above and below the assembly. The desired torque is then applied, and the double tubular is picked up and connected to the tubing string being inserted into the wellbore.

In the instance that the tubing string has already been placed in the wellbore, a retrofit magnetic assembly system 90 is typically chosen. For example, the Type F-collar stop magnetic retrofit assembly may be connected to a running tool used by a wire line operator, and the assembly is run into the wellbore. System 90 is typically run about 12 feet past the connection point of the tubular where the system is desired to be placed, and the system is then retrieved (pulled back up), releasing locking pins 95a and 95b. Collar stop magnetic assembly 90 can then be lowered to the collar connection, wherein it will lock into position, for instance in a collar gap, with slidable arms 92 and 94. The running tool is then removed, shearing lock pins 95a and 95b, and the magnetic assembly 90 will then be locked into position. The running tool is retrieved, and the process repeated, placing a plurality of such Type-F-collar stop magnetic assemblies at the desired distances apart, e.g., about every 450 ft to about 500 ft.

While the various embodiments of the present invention disclosed herein have been made in the context of downhole hydrocarbon well production tubing, it will be appreciated that the inventive concepts taught herein have application to all types of surface and downhole equipment that experience deposit buildup. Moreove, the application of these inventions is not limited to the oil and gas industry, but may be implemented anywhere deposits build up, such as in water lines where scale is often an issue.

All of the methods, processes, and/or apparatus disclosed and claimed herein can be made and executed without undue experimentation in light of the present disclosure. While the methods and apparatus of this invention have been described in terms of preferred embodiments, it will be apparent to those of skill in the art that variations may be applied to the methods, processes and/or apparatus and in the steps or in the sequence of steps of the methods described herein without departing from the concept and scope of the invention. More specifically, it will be apparent that certain features which are both mechanically and functionally related can be substituted for the features described herein while the same or similar results would be achieved. All such similar substitutes and modifications apparent to those skilled in the art are deemed to be within the scope and concept of the invention.

What is claimed is:

1. An apparatus for magnetically treating fluids flowing through a conduit to inhibit the formation and/or deposition of solid phase deposits within the conduit, the apparatus comprising:

an elongated tubular member configured to be interconnected with the conduit in an axial manner, having at a first end an inlet and at a second end longitudinally opposite the first end an outlet for the flowing fluid;

a cylindrical magnet, having a North pole, a South pole, an inner surface and an outer surface;

a magnet retention device comprising a flange having a top surface and disposed about an outer surface of the elongated tubular member;

a collar threadably disposed at the second end of the tubular member; and wherein the magnet is located between the flange and collar and the inner surface of the magnet is adjacent an outer surface of the tubular member and an outside diameter of the magnet is less than an outside diameter of the flange or collar.

2. The apparatus of claim 1, wherein the cylindrical magnet is oriented such that the North pole of the magnet is oriented towards the first end of the tubular member and the South pole of the magnet is oriented towards the second end of the tubular member.

3. The apparatus of claim 1, wherein the cylindrical magnet is a rare earth magnet.

4. The apparatus of claim 3, wherein the rare earth magnet is a samarium cobalt magnet.

5. The apparatus of claim 1, further comprising a protective shield applied to the outer surface of the magnet.

6. The apparatus of claim 1, further comprising:
a cylindrical lock nut disposed between the flange and the second end;
a first cylindrical seal;
a second cylindrical seal, and
wherein the first cylindrical seal forms an interface between the North magnetic pole of the magnet and the top surface of the flange, and the second cylindrical seal forms an interface between the South magnetic pole and an edge of the lock nut, such that the cylindrical lock nut prevents longitudinal movement of the magnet.

7. The apparatus of claim 6, wherein the first and second cylindrical seals are elastomeric O-rings.

8. A system for reducing buildup in a hydrocarbon flow path located in a subterranean well, comprising:
a hydrocarbon flow path disposed in a subterranean well comprising an inner surface and an outer surface and adapted to flow a hydrocarbon-bearing fluid from a distal end to a proximal end;
a substantially cylindrical permanent magnet disposed adjacent the outside surface such that a North magnetic pole is adjacent the distal end and a South magnetic pole is adjacent the proximal end, the magnet having an outer surface and first and second axially spaced ends;
a shield disposed about the outer surface of the magnet and adapted to protect the magnet while its is located in the subterranean welt the shield having an outer diameter;
a first conduit portion located adjacent the first end of the magnet;
a second conduit portion adjacent the second end of the magnet; and
wherein the first and second conduit portions have an outer diameter that is equal to or greater than the outer diameter of the shield.

9. The system of claim 8, wherein the magnet is loosely disposed about the outside surface.

10. The system of claim 8, wherein the magnet comprises a rare earth magnet.

11. The system of claim 10, wherein the rare earth magnet is a samarium cobalt magnet.

12. The system of claim 8, wherein the magnet is cylindrical.

13. The system of claim 8, wherein the system comprises a plurality of magnets spaced apart from one another.

14. The system of claim 8, further comprising:
a lock nut disposed between the first conduit portion and the second conduit portion;
a first cylindrical seal;
a second cylindrical seal, and
wherein the first cylindrical seal forms an interface between the North magnetic pole of the magnet and the first conduit portion, and the second cylindrical seal forms an interface between the South magnetic pole and the second conduit portion.

15. The system of claim 14, wherein the first and second cylindrical seals are elastomeric O-rings.

16. A process for removing or inhibiting the formation of solid phase deposits from hydrocarbons, the process comprising:
connecting an apparatus according to claim 1 to an end of a first conduit running the first conduit and associated system in a subterranean well;
connecting and running additional conduits and systems so as to have at least a plurality of systems longitudinally spaced apart from one another in the wellbore; and
flowing a hydrocarbon-bearing fluid the systems.

17. The process of claim 16, further comprising spacing at least one additional apparatus longitudinally apart from the other a distance from about 100 feet to about 500 feet.

18. The process of claim 16, wherein the solid phase deposits removed or inhibited are scale deposits, paraffin deposits, hydrate deposits, asphaltene deposits, or combinations thereof.

19. An oil or gas production process, comprising:
establishing a hydrocarbon flow path in a subterranean well, the flow path comprising an inner surface and an outer surface and adapted to flow a hydrocarbon-bearing fluid from a distal end to a proximal end;
providing a substantially cylindrical permanent magnet adjacent the outside surface such that a North magnetic pole is adjacent the distal end and a South magnetic pole is adjacent the proximal end, the magnet having an outer surface and first and second axially spaced ends;
providing a shield disposed about the outer surface of the magnet and adapted to protect the magnet while its is located in the subterranean well, the shield having an outer diameter;
providing a first conduit portion located adjacent the first end of the magnet;
providing a second conduit portion adjacent the second end of the magnet; and
resulting in an outer diameter of the first and second conduit portions that is equal to or greater than the outer diameter of the shield.

20. The process of claim 19, wherein the magnet is loosely disposed about the outside surface.

21. The process of claim 19 wherein the magnet comprises a rare earth magnet.

22. The process of claim 21, wherein the rare earth magnet is a samarium cobalt magnet.

23. The process of claim 21, wherein the magnet is cylindrical.

24. The process of claim 19, further comprising providing a plurality of other substantially cylindrical permanent magnets adjacent the outside surface.

25. The process of claim 24, further comprising spacing the plurality of magnets apart from one another from about 100 feet to about 500 feet.

* * * * *